(12) United States Patent
Seo (10) Patent No.: US 11,215,239 B2
(45) Date of Patent: Jan. 4, 2022

(54) DUAL CLUTCH DEVICE

(71) Applicant: Hyundai Transys Inc., Seosan-si (KR)

(72) Inventor: Gak Ha Seo, Yongin-si (KR)

(73) Assignee: Hyundai Transys Inc., Seosan-si (KR)

(*) Notice: Subject to any disclaimer, the term of this patent is extended or adjusted under 35 U.S.C. 154(b) by 0 days.

(21) Appl. No.: 16/951,471

(22) Filed: Nov. 18, 2020

(65) Prior Publication Data

US 2021/0356001 A1 Nov. 18, 2021

(30) Foreign Application Priority Data

May 18, 2020 (KR) .......................... 10-2020-0059201

(51) Int. Cl.
*F16D 21/06* (2006.01)
*F16D 25/10* (2006.01)
*F16F 15/12* (2006.01)
*F16F 15/131* (2006.01)

(52) U.S. Cl.
CPC ............. *F16D 21/06* (2013.01); *F16D 25/10* (2013.01); *F16F 15/1207* (2013.01); *F16D 2021/0661* (2013.01); *F16F 15/13164* (2013.01)

(58) Field of Classification Search
CPC ... F16D 21/06; F16D 2021/0661; B60K 6/38; F16F 15/13164; F16F 15/1207; F16F 15/1216
See application file for complete search history.

(56) References Cited

U.S. PATENT DOCUMENTS

| 2011/0132712 | A1* | 6/2011 | Noehl | F16D 25/083 |
| | | | | 192/48.601 |
| 2016/0245373 | A1* | 8/2016 | Kasuya | B60K 6/40 |
| 2019/0063586 | A1* | 2/2019 | Heeke | B03C 1/282 |
| 2020/0096053 | A1* | 3/2020 | Lehmann | F16D 13/52 |

FOREIGN PATENT DOCUMENTS

| DE | 102015207633 A1 * | 8/2016 | ............ B60K 6/40 |
| KR | 10-2018-0068392 A | 6/2018 | |

* cited by examiner

*Primary Examiner* — Stacey A Fluhart
(74) *Attorney, Agent, or Firm* — Hyunho Park (57) ABSTRACT

An exemplary embodiment of the present invention provides a dual clutch device provided in a housing coupled, at one side, to a transmission and coupled, at the other side thereof, to an engine, the dual clutch device including a motor including a stator and a rotor received in a cover, dual clutches provided close to the transmission based on the motor and connected to the rotor, an engine clutch provided close to the engine based on the motor and connected to the rotor, and a damper provided in the housing and connected to the engine clutch through a damper spline.

18 Claims, 3 Drawing Sheets

DUAL CLUTCH DEVICE

CROSS-REFERENCE TO RELATED APPLICATIONS

This application claims priority to and the benefit of Korean Patent Application No. 10-2020-0059201 filed in the Korean Intellectual Property Office on May 18, 2020, the entire contents of which are incorporated herein by reference.

TECHNICAL FIELD

The present invention relates to a dual clutch device, and more particularly, to a dual clutch device used for a hybrid vehicle.

BACKGROUND ART

A dual clutch transmission (DCT) is a kind of automated manual transmission (AMT) manufactured by mounting a clutch and a gear shift actuator on a manual transmission.

In particular, the dual clutch transmission is a device that has both efficiency of the manual transmission and convenience of an automatic transmission. The dual clutch transmission may not only perform an automatic gear shift operation like a general automatic transmission for a vehicle, but also provide both a gear shift property of the automatic transmission and a gear shift property of the manual transmission because the dual clutch transmission basically includes a mechanism of the manual transmission.

The dual clutch transmission is a transmission that performs the gear shift operation by using and alternately operating two clutches when changing odd-numbered gear positions and even-numbered gear positions. With the mechanism for alternately changing the odd-numbered gear positions and the even-numbered gear positions, the dual clutch transmission may solve a problem of torque interruption that occurs when the manual transmission (MT) and the automation manual transmission in the related art perform the gear shift operations.

Recently, there is a tendency for the dual clutch transmission to be applied to a hybrid electric vehicle (HEV) in order to increase efficiency of the hybrid electric vehicle and maximize fuel economy.

Meanwhile, in the hybrid electric vehicle to which the dual clutch transmission is applied, there is a need for an electric motor and an engine clutch capable of transmitting/shutting off power between the electric motor and an engine.

The mounting of the electric motor and the engine clutch causes an increase in overall length of a dual clutch device, which results in a problem in that mountability of the dual clutch device to be mounted in the vehicle deteriorates.

Because a plurality of fixing means needs to be used to restrict axial movements of the dual clutch and the engine clutch, there is a problem in that the number of components is increased and an assembly property deteriorates.

Meanwhile, in the hybrid electric vehicle to which the dual clutch transmission is applied, the dual clutch device may be mounted with a damper for mitigating impact occurring when the engine clutch operates.

In this case, there is a problem in that an overall length of the transmission is increased in a case in which other components are positioned on a central axis of an engine output shaft and a dual clutch input shaft mounted on the dual clutch device.

SUMMARY OF THE INVENTION

The present invention has been made in an effort to reduce an overall length of a dual clutch device including an engine clutch and an electric motor while maintaining performance of the dual clutch device, thereby improving mountability of the dual clutch device to be mounted in a vehicle.

The present invention has also been made in an effort to provide a dual clutch device capable of restricting axial movements of a dual clutch and an engine clutch by using a simple structure.

An exemplary embodiment of the present invention provides a dual clutch device provided in a housing coupled, at one side, to a transmission and coupled, at the other side thereof, to an engine, the dual clutch device including a motor including a stator and a rotor received in a cover, dual clutches formed on the transmission side with respect to the motor and connected to the rotor, an engine clutch formed on the engine side with respect to the motor and connected to the rotor, and a damper provided in the housing and connected to the engine clutch through a damper spline, in which the damper spline is disposed outside the engine clutch and positioned between an outer diameter portion and an inner diameter portion of the engine clutch, and a diameter of the damper spline is larger than a diameter of an engine fastening member configured to fasten the engine to the damper.

The cover may be positioned between the dual clutches and the engine clutch.

The dual clutches may be connected to a dual clutch input shaft connected to a rotor shaft of the rotor by means of a spline structure, and the engine clutch may be connected to the rotor shaft of the rotor by means of a spline structure.

The dual clutches may receive rotational power, which is transmitted from an engine output shaft of the engine, through the dual clutch input shaft via the engine clutch and the rotor, and the dual clutches may selectively provide the received rotational power to the transmission.

The engine clutch may include a retainer supported on an outer diameter portion of the rotor shaft and connected to the damper through the damper spline; and a disc connected to an inner diameter portion of the retainer, and the disc may be fixed to the rotor shaft by a snap ring.

The retainer may be supported on the outer diameter portion of the rotor shaft by a support bearing.

A fixing member may be coupled to an end of the rotor shaft positioned on the engine side, and the fixing member may fix the support bearing and the rotor shaft in an axial direction.

A support ring may be inserted between the fixing member and, the support bearing and the rotor shaft.

The disc may include one or more inner discs connected to the outer diameter portion of the rotor shaft by means of a spline structure and fixed to the rotor shaft by the snap ring, and one or more outer discs disposed between the inner discs and connected to the inner diameter portion of the retainer by means of a spline structure, a separating spring may be interposed between the inner discs, and a gap may be formed between the inner discs by elastic force of the separating spring.

The damper spline may be disposed outside the outer disc and positioned between an outer diameter portion and an inner diameter portion of the outer disc.

The inner disc, which is in contact with the snap ring among the one or more inner discs, may have a stepped portion formed in a direction of the engine.

An outer diameter of the separating spring may be smaller than an inner diameter of the outer disc.

Another exemplary embodiment of the present invention provides a dual clutch device provided in a housing coupled, at one side thereof, to a transmission and coupled, at the other side thereof, to an engine, the dual clutch device including a motor including a stator and a rotor received in a cover, dual clutches formed on the transmission side with respect to the motor and connected to the rotor, an engine clutch formed on the engine side with respect to the motor the motor and connected to the rotor, and a damper provided in the housing and connected to the engine clutch through a damper spline, in which the dual clutch, the motor, and the damper are disposed in a row in a direction of an engine output shaft of the engine, and at least a part of the engine clutch is disposed outside the rotor and positioned on an inner diameter portion side of the rotor.

The cover may be positioned between the dual clutches and the engine clutch.

The dual clutches may be connected to a dual clutch input shaft connected to a rotor shaft of the rotor by means of a spline structure, and the engine clutch may be connected to the rotor shaft of the rotor by means of a spline structure.

The dual clutches may receive rotational power, which is transmitted from an engine output shaft of the engine, through the dual clutch input shaft via the engine clutch and the rotor, and the dual clutches may selectively provide the received rotational power to the transmission.

A terminal may be connected to one side of the stator, and the terminal may be positioned between the motor and the engine and opened, at one side thereof, in a direction of the engine.

A damper spring may be disposed above the damper, and a center of the damper spring in a radial direction may be positioned below the terminal.

The dual clutches may be connected to dual clutch actuators that operate in an axial direction, the dual clutch actuators may be provided on the transmission side, the engine clutch may be connected to an engine clutch actuator that operates in the axial direction, and the engine clutch actuator may be coupled to the cover.

The dual clutch device may include a flow path formed between the motor and the dual clutches and configured to be supplied with hydraulic pressure from the outside of the housing, and the flow path may be connected to the engine clutch actuator by penetrating the cover.

According to the present invention, it is possible to adjust a size and a position of the damper spline and optimize a layout of the engine clutch and the peripheral components, thereby reducing an overall length of the dual clutch device, and thus improving mountability of the dual clutch device to be mounted in the vehicle.

It is possible to restrict the axial movements of the dual clutch, the engine clutch, and the rotor by using the single fixing member, thereby reducing the number of components of the dual clutch device, reducing the number of parts to be manufactured, and improving assembly properties.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly-known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 1:
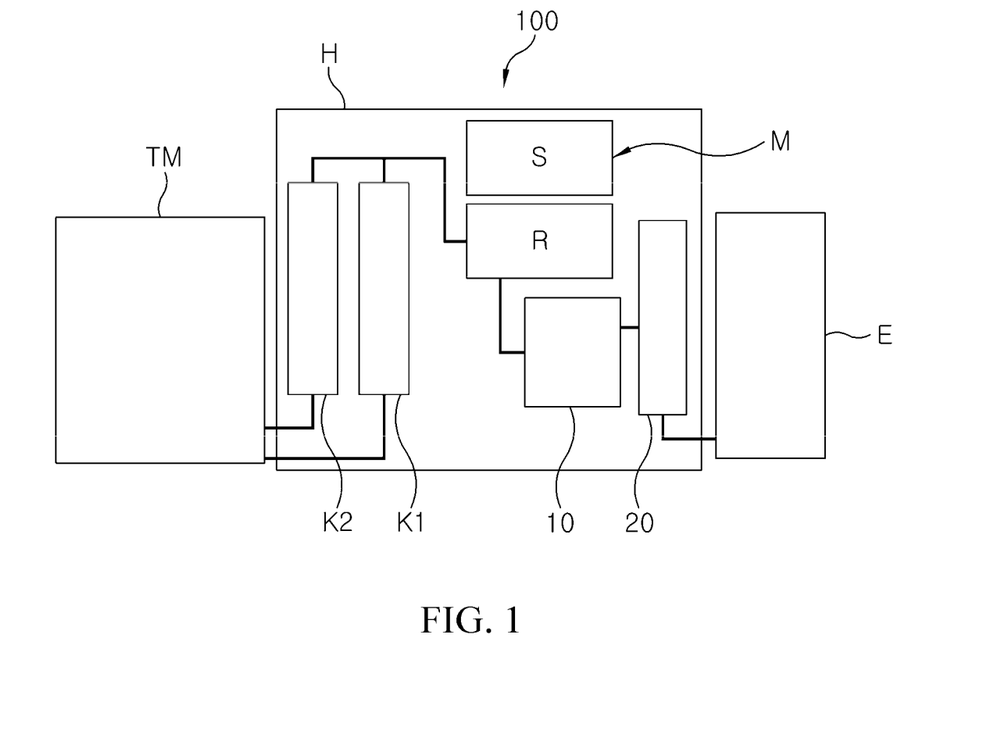
FIG. 1 is a view illustrating a schematic structure of a hybrid vehicle to which a dual clutch device according to an exemplary embodiment of the present invention is applied.

FIG. 1 is a view illustrating a schematic structure of a hybrid vehicle to which a dual clutch device 100 according to an exemplary embodiment of the present invention is applied.

Referring to FIG. 1, the dual clutch device 100 may be provided in a housing H.

For example, the dual clutch device 100 may have a motor M, dual clutches K1 and K2, an engine clutch 10, and a damper 20 in the housing H.

In addition, as illustrated in FIG. 1, a transmission TM may be coupled to one side of the housing H, and an engine E may be coupled to the other side of the housing H.

The motor M is a kind of electric motor and includes a rotor R and a stator S, such that the motor M may serve as both a motor and a generator.

For example, power may be transmitted to the transmission TM only by operating the motor M in an EV mode, whereas rotational power of the motor M acts as auxiliary power and may be transmitted to the transmission TM in an HEV mode.

The engine clutch 10 may be configured to transmit or shut off the power to the motor M from the engine E.

The damper 20 may be connected to the engine E and the engine clutch 10 and configured to mitigate impact that may occur when the engine clutch 10 operates.

For example, the damper 20 may serve to mitigate a spring motion of a damper spring 24 to be described below.

In the exemplary embodiment of the present invention, the dual clutch device 100 may be applied to the hybrid vehicle.

For example, the dual clutch device 100 applied to the hybrid vehicle may transmit the rotational power, which is transmitted from an engine output shaft of the engine E, to the dual clutches K1 and K2 via the engine clutch 10 and the rotor R of the motor M.

Thereafter, the dual clutches K1 and K2 may be selectively connected to transmission input shafts (not illustrated) and may selectively transmit the received rotational power to odd-numbered gears or even-numbered gears of the transmission TM through the transmission input shafts.

In this case, at least two or more transmission input shafts may be provided to be selectively connected to the odd-numbered gears or the even-numbered gears of the transmission TM in accordance with the power transmission. The clutch K1 of the dual clutches K1 and K2 may transmit the rotational power to the odd-numbered gears of the transmission TM, and the clutch K2 of the dual clutches K1 and K2 may transmit the rotational power to the even-numbered gears of the transmission TM.

Figure 2:
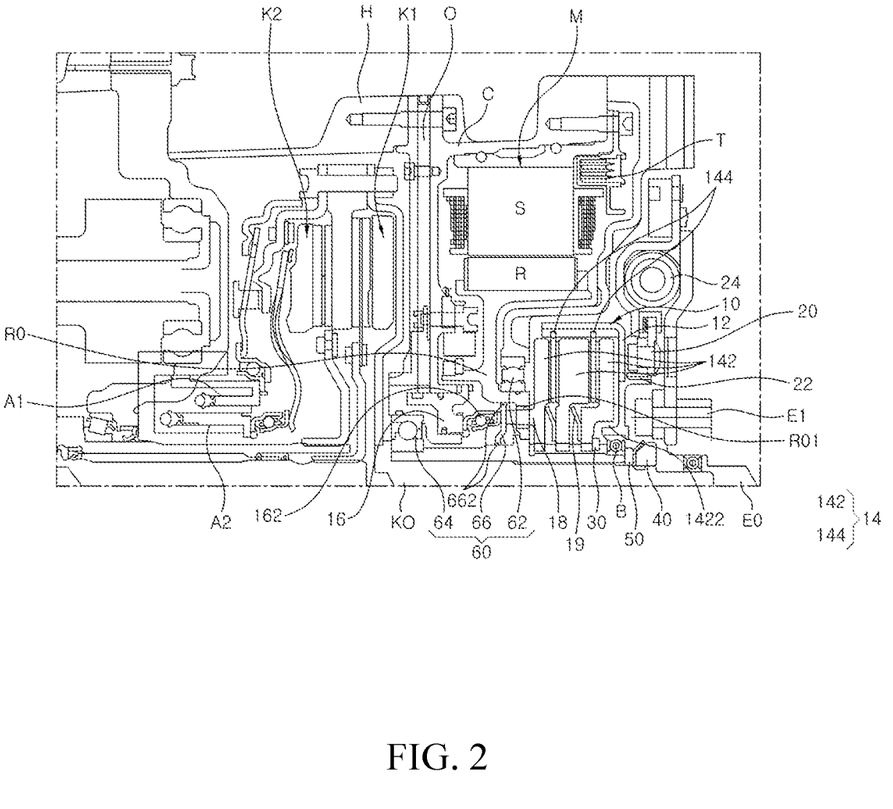
FIG. 2 is a view illustrating the dual clutch device according to the exemplary embodiment of the present invention.
Figure 3:
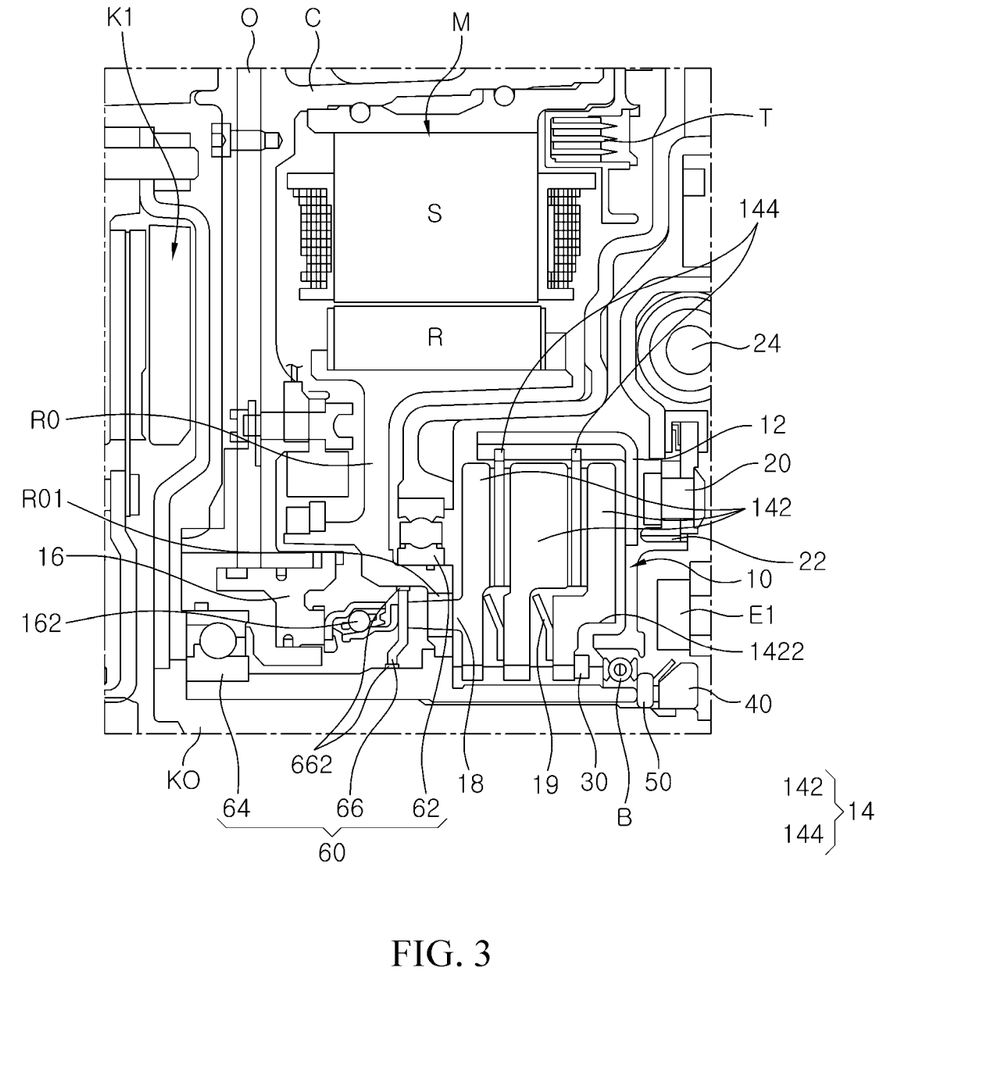
FIG. 3 is a view illustrating a part of FIG. 2.

FIG. 2 is a view illustrating the dual clutch device 100 according to the exemplary embodiment of the present invention, and FIG. 3 is a view illustrating a part of FIG. 2.

Hereinafter, the configuration of the dual clutch device 100 according to the exemplary embodiment of the present invention will be described in detail with reference to FIGS. 2 and 3.

In this case, the illustration of the transmission TM and the engine E is omitted from FIGS. 2 and 3.

Referring to FIGS. 2 and 3, the motor M may include the stator S and the rotor R.

The stator S and the rotor R may be received in a cover C, and the rotor R may be connected to a rotor shaft R0.

For example, the cover C may be positioned between the dual clutches K1 and K2 and the engine clutch 10 and may be a part of the housing H.

The rotor R may be connected to a dual clutch input shaft K0 by means of a spline structure through the rotor shaft R0, and the dual clutch input shaft K0 is connected to the dual clutches K1 and K2. The rotor R may be rotatably supported by the rotor shaft R0, and the stator S may be fixed in the cover C.

As illustrated in FIGS. 2 and 3, at least a part of the rotor shaft R0 may extend to the outside of the cover C and may be connected to the dual clutch input shaft K0 by means of the spline structure.

In the exemplary embodiment of the present invention, as illustrated in FIGS. 2 and 3, the dual clutches K1 and K2 may be formed on the transmission TM side with respect to the motor M.

In addition, the dual clutches K1 and K2 may be connected to the dual clutch input shaft K0 connected to the rotor shaft R0 of the rotor R by means of the spline structure.

In this case, the dual clutches K1 and K2 may be connected to dual clutch actuators A1 and A2, respectively, which operate in an axial direction, and the dual clutch actuators A1 and A2 may be provided on the transmission side.

In the exemplary embodiment of the present invention, as described above, the clutch K1 of the dual clutches K1 and K2 may transmit the rotational power to the odd-numbered gears of the transmission TM. Particularly, the clutch K1 may be connected to the clutch actuator A1 of the dual clutch actuators A1 and A2, and the clutch actuator A1 may transmit the power to the transmission input shaft connected to the odd-numbered gears of the transmission TM.

The clutch K2 of the dual clutches K1 and K2 may transmit the rotational power to the even-numbered gears of the transmission TM. Particularly, the clutch K2 may be connected to the clutch actuator A2 of the dual clutch actuators A1 and A2, and the clutch actuator A2 may transmit the power to the transmission input shaft connected to the even-numbered gears of the transmission TM.

In the exemplary embodiment of the present invention, a flow path O may be provided between the motor M and the dual clutches K1 and K2, and the flow path O may be supplied with hydraulic pressure from the outside of the housing H, thereby operating the engine clutch 10.

The engine clutch 10 may be formed on the engine E side with respect to the motor M, and the engine clutch 10 may be connected to the rotor shaft R0 of the rotor R by means of the spline structure.

In the exemplary embodiment of the present invention, the engine clutch 10 may be connected to an engine output shaft E0 of the engine E, may receive the rotational power transmitted from the engine output shaft E0, and then may transmit the rotational power to the rotor R.

The engine clutch 10 may be connected to the engine clutch actuator 16 that operates in the axial direction, and the engine clutch actuator 16 may be coupled to the cover C.

In this case, the engine clutch 10 includes a penetration portion 18 protruding toward the engine clutch actuator 16.

The penetration portion 18 of the engine clutch 10 may be connected to the engine clutch actuator 16 by penetrating a through hole R01 formed at one side of the rotor shaft R0 exposed to the outside of the cover C.

In this case, an engine clutch actuator bearing 162 may be provided between the penetration portion 18 of the engine clutch 10 and the engine clutch actuator 16.

The engine clutch actuator bearing 162 may support the engine clutch actuator 16 so that the engine clutch actuator 16 is rotatable. The engine clutch actuator bearing 162 may support axial force that occurs in accordance with the operation of the engine clutch actuator 16.

The flow path O may be connected to the engine clutch actuator 16 by penetrating the cover C. The engine clutch actuator 16 pushes out the penetration portion 18 of the engine clutch 10 by being supplied with the hydraulic pressure from the flow path O, thereby operating the engine clutch 10.

In this case, the dual clutch actuators A1 and A2 and the engine clutch actuator 16 may operate in the same direction from the transmission TM to the engine E.

In the exemplary embodiment of the present invention, as illustrated in FIGS. 2 and 3, the dual clutches K1 and K2, the motor M, and the damper 20 may be disposed in a row in a direction of the engine output shaft E0 of the engine E.

For example, at least a part of the engine clutch 10 may be disposed outside the rotor R and positioned close to an inner diameter portion of the rotor R.

A terminal T may be connected to one side of the stator S of the motor M.

In this case, the terminal T may be positioned between the motor M and the engine E and opened, at one side thereof, in the direction of the engine E.

For example, the terminal T may be a connector.

Referring to FIGS. 2 and 3, the dual clutch device 100 includes the damper 20 provided in the housing H and connected to the engine clutch 10 through a damper spline 22.

The damper spring 24 may be disposed above the damper 20, and a center of the damper spring 24 in a radial direction may be positioned below the terminal T.

With the above-mentioned configuration, the dual clutch device 100 according to the exemplary embodiment of the present invention has an effect of reducing an overall length thereof by optimizing the layout of the respective components provided in the housing H.

More particularly, in the dual clutch device 100 according to the exemplary embodiment of the present invention, the components (including the engine clutch 10, etc.) provided in the housing H may be disposed in a state in which the dual clutches K1 and K2, the motor M, and the damper 20 are disposed in a row in the direction of the engine output shaft E0 of the engine E.

In this state, as illustrated in FIGS. 2 and 3, at least a part of the engine clutch 10 may be positioned on the inner diameter portion side of the rotor R.

In the state in which the terminal T is positioned between the motor M and the engine E, the center of the damper spring 24 in the radial direction may be positioned below the terminal T.

The dual clutch actuators A1 and A2 may be provided close to the transmission TM, and the motor M received in the cover C may be positioned between the dual clutches K1 and K2 and the engine clutch 10.

The engine clutch actuator 16 may be coupled to the cover C, and the flow path O, through which the hydraulic pressure is supplied to the engine clutch actuator 16, may be positioned between the motor M and the dual clutches K1 and K2.

Therefore, according to the dual clutch device 100 for a hybrid vehicle according to the exemplary embodiment of the present invention, it is possible to reduce an overall length of the dual clutch device 100 and improve mountability of the dual clutch device 100 to be mounted in the vehicle even though the motor M and the engine clutch 10 are applied to a conventional DCT vehicle in the related art.

Referring to FIGS. 2 and 3, the engine clutch 10 may have a retainer 12 supported by an outer diameter portion of the rotor shaft R0 and connected to the damper 20 through the damper spline 22.

For example, the damper spline 22 may be disposed outside the engine clutch 10 and positioned between an outer diameter portion and an inner diameter portion of the engine clutch 10.

In this case, a diameter of the damper spline 22 may be larger than a diameter of an engine fastening member E1 used to fasten the engine E to the damper 20.

In the exemplary embodiment of the present invention, the retainer 12 may be supported on the outer diameter portion of the rotor shaft R0 by a support bearing B.

A disc 14 may be connected to an inner diameter portion of the retainer 12, and the disc 14 may be stably fixed to the rotor shaft R0 by a snap ring 30.

The snap ring 30 may restrict an axial movement of at least a part of the disc 14 toward the engine E in the state in which the disc 14 is fixed to the rotor shaft R0.

The snap ring 30 may restrict an axial movement of at least a part of the engine clutch 10 toward the engine E in the state in which the entire engine clutch 10 including the disc 14 is fixed to the rotor shaft R0.

In the exemplary embodiment of the present invention, as illustrated in FIGS. 2 and 3, the disc 14 includes one or more inner discs 142 connected to the outer diameter portion of the rotor shaft R0 by the spline structure and fixed to the rotor shaft R0 by the snap ring 30, and one or more outer discs 144 disposed between the inner discs 142 and connected to the inner diameter portion of the retainer 12 by means of the spline structure.

For example, as illustrated in FIGS. 2 and 3, the penetration portion 18 may be formed on the inner disc 142 which is positioned close to the engine clutch actuator 16 among the one or more inner discs 142.

Separating springs 19 may be interposed between the inner discs 142, and an outer diameter of the separating spring 19 may be smaller than an inner diameter of the outer disc 144.

For example, when the hydraulic pressure is supplied to the engine clutch actuator 16 from the flow path O and thus the penetration portion 18 moves, the inner disc 142, which is positioned close to the engine clutch actuator 16, may move in the axial direction.

In this case, as illustrated in FIGS. 2 and 3, the axial movement toward the engine E of the inner disc 142, which is in contact with the snap ring 30 among the one or more inner discs 142, may be restricted.

The separating spring 19 may be compressed when the inner disc 142 positioned close to the engine clutch actuator 16 moves in the axial direction.

Meanwhile, when the supply of the hydraulic pressure to the engine clutch actuator 16 from the flow path O is shut off, the inner disc 142, which is positioned close to the engine clutch actuator 16, may be returned back to an original position by elastic restoring force of the separating spring 19, and thus a gap may be formed between the inner discs 142.

In the exemplary embodiment of the present invention, the rotational power of the engine E may be transmitted to the retainer 12, the outer disc 144, and the inner disc 142 of the engine clutch 10, the rotor shaft R0, and the dual clutch input shaft K0, in this order, through the engine output shaft E0, and then transmitted to the dual clutches K1 and K2.

The damper spline 22 may be larger than a diameter of the engine fastening member E1, and the damper spline 22 may be disposed outside the outer disc 144 and positioned between the outer diameter portion and the inner diameter portion of the outer disc 144.

As illustrated in FIGS. 2 and 3, the inner disc 142, which is in contact with the snap ring 30 among the one or more inner discs 142, may have a stepped portion 1422 in the direction of the engine E.

With the above-mentioned configuration, the dual clutch device 100 according to the exemplary embodiment of the present invention may reduce the overall length of the dual clutch device 100 by adjusting a size and a position of the damper spline 22.

More particularly, as illustrated in FIGS. 2 and 3, in the dual clutch device 100 according to the exemplary embodiment of the present invention, the damper spline 22 may be disposed outside the outer disc 144 and positioned between the outer diameter portion and the inner diameter portion of the outer disc 144, and the size of the damper spline 22 may be larger than the diameter of the engine fastening member E1, such that it is possible to ensure a sufficient space in which the engine fastening member E1 may be positioned in the housing H.

Since the inner disc 142, which is in contact with the snap ring 30, has the stepped portion 1422 formed in the direction of the engine E, it is possible to ensure a sufficient space in which the support bearing B is disposed.

Since the outer diameter of the separating spring 19 is smaller than the inner diameter of the outer disc 144, it is possible to reduce a space to be occupied by the entire engine clutch 10.

With the above-mentioned configuration, the dual clutch device 100 for a hybrid vehicle according to the exemplary embodiment of the present invention may ensure the sufficient space in which the components may be disposed close to the engine output shaft E0 and the dual clutch input shaft K0, thereby reducing the overall length of the dual clutch device 100, and thus improving mountability of the dual clutch device 100 to be mounted in the vehicle.

Referring to FIGS. 2 and 3, a fixing member 40 may be coupled to an end of the rotor shaft R0 positioned on the engine side.

The dual clutches K1 and K2 and the engine clutch 10 may be operated by the dual clutch actuators A1 and A2 and the engine clutch actuator 16, respectively, in the axial direction (the direction from the transmission TM to the engine E).

In this case, because reaction force is required to operate the dual clutches K1 and K2 and the engine clutch 10 when the actuators operate, it is essential that the dual clutches K1 and K2 and the engine clutch 10 are fixed in the axial direction.

To this end, the dual clutch device 100 according to the exemplary embodiment of the present invention includes the fixing member 40 that fixes the support bearing B and the rotor shaft R0 in the axial direction.

For example, the fixing member 40 may be a nut, and one side of the fixing member 40 may be coupled to the dual clutch input shaft K0.

As illustrated in FIGS. 2 and 3, the fixing member 40 may fix, in the axial direction, the support bearing B positioned between the retainer 12 of the engine clutch 10 and the outer diameter portion of the rotor shaft R0 and the rotor shaft R0.

The engine clutch 10, which is supported on the outer diameter portion of the rotor shaft R0 by the support bearing B, may also be fixed in the axial direction by the fixing member 40.

In this case, since the dual clutch input shaft K0 is connected to the rotor shaft R0 by means of the spline structure as described above, the dual clutches K1 and K2 connected to the dual clutch input shaft K0 may also be fixed in the axial direction by the fixing member 40.

Therefore, since the axial movements of the dual clutches K1 and K2, the engine clutch 10, and the rotor R toward the engine E may be restricted by the single fixing member 40, it is possible to reduce the number of components of the dual clutch device 100, reduce the number of parts to be manufactured, and improve assembly properties.

Meanwhile, as illustrated in FIGS. 2 and 3, a support ring 50 may be inserted between the fixing member 40 and, the support bearing B and the rotor shaft R0.

For example, the support ring 50 may increase fastening surface pressure between the fixing member 40 and, the support bearing B and the rotor shaft R0.

Hereinafter, configurations of sealing parts 60 of the dual clutch device 100 according to the exemplary embodiment of the present invention will be described with reference to FIGS. 2 and 3.

Referring to FIGS. 2 and 3, the one or more sealing parts 60 may be provided between the cover C of the motor M and the rotor shaft R0 of the rotor R.

For example, as illustrated in FIGS. 2 and 3, the sealing part 60 may seal a portion of the rotor shaft R positioned in the cover C.

The sealing part 60 may seal the rotor R and the stator S positioned in the cover C.

More particularly, the sealing parts 60 includes a first sealing member 62 inserted between one end of the cover C positioned close to the engine clutch 10 and one side of the rotor shaft R0 positioned close to the engine clutch 10 and exposed to the outside of the cover C.

The sealing parts 60 includes a second sealing member 64 inserted between the other end of the cover C positioned close to the flow path O and the other side of the rotor shaft R0 positioned close to the flow path O and exposed to the outside of the cover C.

As described above, the first sealing member 62 and the second sealing member 64 may seal the portions of the rotor R, the stator S, and the rotor shaft R0, the portions being positioned in the cover C.

For example, each of the first sealing member 62 and the second sealing member 64 may be a seal bearing.

With the configurations of the first sealing member 62 and the second sealing member 64 of the sealing parts 60, it is possible to prevent dust, which occurs when the engine clutch 10 operates, or foreign substances and moisture from entering a gap between the cover C of the motor M and the rotor shaft R0 of the rotor R.

The sealing part 60 may be provided between the engine clutch 10 and the inner diameter portion of the rotor shaft R0 of the rotor R.

More particularly, the sealing parts 60 may further include a sealing plate 66 provided between the engine clutch actuator 16 and the penetration portion 18 of the engine clutch 10.

As described above, the penetration portion 18 may be connected to the engine clutch actuator 16 by penetrating the through hole R01 formed at one side of the rotor shaft R0.

The engine clutch actuator bearing 162 may be provided between the sealing plate 66 and the engine clutch actuator 16.

Since the dual clutch device 100 according to the exemplary embodiment of the present invention has the structure in which the penetration portion 18 operates and penetrates the rotor shaft R0, at least a part of the rotor shaft R0 (particularly, a part of the inner diameter portion of the rotor shaft R0) may be provided to surround the engine clutch actuator bearing 162 so that the sealing plate 66 is stably disposed.

In this structure, an inner diameter portion and an outer diameter portion of the sealing plate 66 may be positioned between the inner diameter portions of the rotor shaft R0.

Meanwhile, the engine clutch actuator 16 may be supplied with the hydraulic pressure from the flow path O as described above.

In this case, the hydraulic pressure supplied from the flow path O pushes the engine clutch actuator 16 in the axial direction (particularly, the direction of the engine output shaft E0), and the engine clutch actuator bearing 162 and the sealing plate 66 may be moved in the axial direction by the axial movement of the engine clutch actuator 16.

As the engine clutch actuator bearing 162 and the sealing plate 66 are moved in the axial direction by the axial movement of the engine clutch actuator 16, the penetration portion 18 of the engine clutch 10 may also be moved in the axial direction, thereby operating the engine clutch 10 in the axial direction.

When the penetration portion 18 is moved in the axial direction by the operation of the engine clutch actuator 16, the sealing plate 66 may apply an axial load to the penetration portion 18 while moving in the axial direction.

In this case, the sealing plate 66 is moved in the axial direction and pushes out the penetration portion 18 in the axial direction, thereby preventing dust having passed through the through hole R01 from entering the inner diameter portion of the rotor shaft R0.

The inner diameter portion and the outer diameter portion of the sealing plate 66 may be in contact with the inner diameter portion of the rotor shaft R0 while the sealing plate 66 is moved in the axial direction by the operation of the engine clutch actuator 16.

or example, sealing members 662 may be provided on the inner diameter portion and the outer diameter portion of the sealing plate 66, respectively.

The sealing member 662 is in contact with the inner diameter portion of the rotor shaft R0, and may block gaps between the inner diameter portion of the rotor shaft R0, and the inner diameter portion and the outer diameter portion of the sealing plate 66, respectively.

Since the penetration portion 18 is moved in the axial direction by the axial movement of the sealing plate 66, it is possible to prevent dust from entering the inner diameter portion of the rotor shaft R0 from the through hole R01.

Meanwhile, the sealing member 662 and the rotor shaft R0 may be made of the same material.

Therefore, since the sealing member 662 and the rotor shaft R0, which are made of the same material, are in contact with each other, no deterioration in efficiency caused by the operation of the engine clutch 10 occurs.

With the above-mentioned configurations of the sealing parts 60, the sealing structure between the motor M and the engine clutch 10 is tightly configured, such that the motor M may be sealed from dust, which occurs when the engine clutch 10 operates, or foreign substances and moisture.

The performance and durability of the motor may be maintained by the sealing structure of the motor M.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A dual clutch device provided in a housing coupled, at one side, to a transmission and coupled, at the other side thereof, to an engine, the dual clutch device comprising:
   a motor comprising a stator and a rotor received in a cover;
   dual clutches formed on the transmission side with respect to the motor connected to the rotor;
   an engine clutch formed on the engine side with respect to the motor and connected to the rotor; and
   a damper provided in the housing and connected to the engine clutch through a damper spline,
   wherein the damper spline is disposed outside the engine clutch and positioned between an outer diameter portion and an inner diameter portion of the engine clutch, and a diameter of the damper spline is larger than a diameter of an engine fastening member configured to fasten the engine to the damper, and
   wherein the dual clutches are connected to a dual clutch input shaft connected to a rotor shaft of the rotor by means of a spline structure, and the engine clutch is connected to the rotor shaft of the rotor by means of a spline structure.

2. The dual clutch device of claim 1, wherein the cover is positioned between the dual clutches and the engine clutch.

3. The dual clutch device of claim 1, wherein the dual clutches receive rotational power, which is transmitted from an engine output shaft of the engine, through the dual clutch input shaft via the engine clutch and the rotor, and the dual clutches selectively provide the received rotational power to the transmission.

4. The dual clutch device of claim 1, wherein the engine clutch comprises:
   a retainer supported on an outer diameter portion of the rotor shaft and connected to the damper through the damper spline; and
   a disc connected to an inner diameter portion of the retainer, and
   wherein the disc is fixed to the rotor shaft by a snap ring.

5. The dual clutch device of claim 4, wherein the disc comprises:
   one or more inner discs connected to the outer diameter portion of the rotor shaft by means of a spline structure and fixed to the rotor shaft by the snap ring; and
   one or more outer discs disposed between the inner discs and connected to the inner diameter portion of the retainer by means of a spline structure, and
   wherein a separating spring is interposed between the inner discs, and a gap is formed between the inner discs by elastic force of the separating spring.

6. The dual clutch device of claim 5, wherein the damper spline is disposed outside the outer disc and positioned between an outer diameter portion and an inner diameter portion of the outer disc.

7. The dual clutch device of claim 5, wherein the inner disc, which is in contact with the snap ring among the one or more inner discs, has a stepped portion formed in a direction of the engine.

8. The dual clutch device of claim 5, wherein an outer diameter of the separating spring is smaller than an inner diameter of the outer disc.

9. The dual clutch device of claim 4, wherein the retainer is supported on the outer diameter portion of the rotor shaft by a support bearing.

10. The dual clutch device of claim 9, wherein a fixing member is coupled to an end of the rotor shaft positioned on the engine side, and the fixing member fixes the support bearing and the rotor shaft in an axial direction.

11. The dual clutch device of claim 10, wherein a support ring is inserted between the fixing member and, the support bearing and the rotor shaft.

12. A dual clutch device provided in a housing coupled, at one side thereof, to a transmission and coupled, at the other side thereof, to an engine, the dual clutch device comprising:
a motor comprising a stator and a rotor received in a cover;
dual clutches formed on the transmission side with respect to the motor and connected to the rotor;
an engine clutch formed on the engine side with respect to the motor and connected to the rotor; and
a damper provided in the housing and connected to the engine clutch through a damper spline,
wherein the dual clutch, the motor, and the damper are disposed in a row in a direction of an engine output shaft of the engine, and at least a part of the engine clutch is disposed outside the rotor and positioned on an inner diameter portion side of the rotor, and
wherein the dual clutches are connected to a dual clutch input shaft connected to a rotor shaft of the rotor by means of a spline structure, and the engine clutch is connected to the rotor shaft of the rotor by means of a spline structure.

13. The dual clutch device of claim 12, wherein the cover is positioned between the dual clutches and the engine clutch.

14. The dual clutch device of claim 12, wherein the dual clutches receive rotational power, which is transmitted from an engine output shaft of the engine, through the dual clutch input shaft via the engine clutch and the rotor, and the dual clutches selectively provide the received rotational power to the transmission.

15. The dual clutch device of claim 12, wherein a terminal is connected to one side of the stator, and the terminal is positioned between the motor and the engine and opened, at one side thereof, in a direction of the engine.

16. The dual clutch device of claim 15, wherein a damper spring is disposed above the damper, and a center of the damper spring in a radial direction is positioned below the terminal.

17. The dual clutch device of claim 12, wherein the dual clutches are connected to dual clutch actuators that operate in an axial direction, and the dual clutch actuators are provided on the transmission side, and
wherein the engine clutch is connected to an engine clutch actuator that operates in the axial direction, and the engine clutch actuator is coupled to the cover.

18. The dual clutch device of claim 17, comprising:
a flow path formed between the motor and the dual clutches and configured to be supplied with hydraulic pressure from the outside of the housing,
wherein the flow path is connected to the engine clutch actuator by penetrating the cover.

* * * * *